US012498653B2

(12) United States Patent
Shani et al.

(10) Patent No.: US 12,498,653 B2
(45) Date of Patent: Dec. 16, 2025

(54) FORCE ADJUSTMENT ARRANGEMENT

(71) Applicant: Hewlett-Packard Development Company, L.P., Spring, TX (US)

(72) Inventors: Tal Shani, Nes Ziona (IL); Asaf Shoshani, Nes Ziona (IL); Lavi Cohen, Nes Ziona (IL); Zeharia Levi, Nes Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/996,082

(22) PCT Filed: Apr. 14, 2020

(86) PCT No.: PCT/US2020/028139
§ 371 (c)(1),
(2) Date: Oct. 13, 2022

(87) PCT Pub. No.: WO2021/211101
PCT Pub. Date: Oct. 21, 2021

(65) Prior Publication Data

US 2023/0126205 A1 Apr. 27, 2023

(51) Int. Cl.
*G03G 15/11* (2006.01)
*G03G 21/00* (2006.01)

(52) U.S. Cl.
CPC ......... *G03G 15/11* (2013.01); *G03G 21/0088* (2013.01)

(58) Field of Classification Search
CPC ............................... G03G 15/10; G03G 15/11
See application file for complete search history.

(56) References Cited

U.S. PATENT DOCUMENTS

| | | | | |
|---|---|---|---|---|
| 5,387,760 | A * | 2/1995 | Miyazawa | G03G 15/101 399/239 |
| 5,436,711 | A | 7/1995 | Hauser | |
| 6,549,745 | B2 | 4/2003 | May et al. | |
| 7,003,236 | B2 | 2/2006 | Fujita et al. | |
| 8,798,516 | B2 | 8/2014 | Okamoto et al. | |
| 2001/0017104 | A1* | 8/2001 | Choi | B05C 1/083 118/224 |
| 2002/0197083 | A1 | 12/2002 | Yoshino et al. | |
| 2008/0175617 | A1 | 7/2008 | Morishita | |
| 2009/0052948 | A1 | 2/2009 | Ozerov | |
| 2011/0249990 | A1 | 10/2011 | Izawa et al. | |
| 2012/0237237 | A1* | 9/2012 | Hirai | G03G 15/10 399/57 |
| 2017/0364012 | A1 | 12/2017 | Okumura | |

FOREIGN PATENT DOCUMENTS

| | | | |
|---|---|---|---|
| EP | 2378376 | A1 | 10/2011 |
| EP | 3264192 | A1 | 1/2018 |
| EP | 2605914 | B1 | 2/2018 |
| JP | 2004-139114 | A | 5/2004 |
| JP | 2013-148799 | A | 8/2013 |
| WO | 2018/169512 | A1 | 9/2018 |

* cited by examiner

*Primary Examiner* — Walter L Lindsay, Jr.
*Assistant Examiner* — Andrew V Do
(74) *Attorney, Agent, or Firm* — Jordan IP Law, LLC

(57) ABSTRACT

Disclosed is a liquid electrophotographic printing apparatus that comprises a developer roller, a cleaning member to contact the developer roller with a contact force and a force adjustment arrangement to adjust the contact force.

15 Claims, 4 Drawing Sheets

FORCE ADJUSTMENT ARRANGEMENT

BACKGROUND

Liquid electrophotographic printing uses liquid printing fluid (e.g. ink) to form images on a print medium. A liquid electrophotographic printer may use digitally controlled light sources to create a latent image in the charged surface of an imaging element, such as a photo imaging plate (PIP). In this process, a uniform static electric charge is applied to the PIP and the lasers dissipate charge in certain areas creating the latent image in the form of an invisible electrostatic charge pattern conforming to the image to be printed. An electrically charged printing substance, in the form of liquid printing fluid, is then applied and attracted to the partially-charged surface of the PIP, recreating the desired image.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

In the following description, for purposes of explanation, numerous specific details are set forth in order to provide a thorough understanding of the present systems and methods. It will be apparent, however, that the present apparatus, systems and methods may be practiced without these specific details. Reference in the specification to "an example" or similar language means that a particular feature, structure, or characteristic described in connection with the example is included in at least that one example, but not necessarily in other examples.

In certain liquid electrophotographic printers, a transfer element is used to transfer developed liquid printing fluid (e.g. ink) to a print medium. For example, a developed image, comprising liquid printing fluid aligned according to a latent image, may be transferred from a PIP to a transfer blanket of a transfer cylinder and from the transfer blanket to a desired substrate, which is placed into contact with the transfer blanket. At least two different methodologies may be used to print multi-color images on a liquid electrophotographic printer. Both methodologies involve the generation of multiple separations, where each separation is a single-color partial image. When these separations are superimposed it can result in the desired full color image being formed. In a first methodology, a color separation layer is generated on the PIP, transferred to the transfer cylinder and is finally transferred to a substrate. Subsequent color separation layers are similarly formed and are successively transferred to the substrate on top of the previous layer(s). This is sometimes known as a "multi-shot color" imaging sequence. In a second methodology, a "one shot color" process is used. In these systems, the PIP transfers a succession of separations to the transfer blanket on the transfer cylinder, building up each separation layer on the blanket. Once some number of separations are formed on the transfer blanket, they are all transferred to the substrate together. Both methodologies result in a full color image being formed.

In some electrophotographic printers, a binary ink developer (BID) comprises liquid printing fluid (e.g. liquid ink) which is to be transferred to the PIP. Liquid ink comprises ink particles and a carrier liquid. More than one BID can be used, each BID comprising different coloured printing fluid. The printing fluid or pigment particles are charged and may be arranged upon the PIP 17 based on a charge pattern of a latent image. Once liquid printing fluid is applied to the latent image on the PIP 17, an image is formed on the PIP 17. When the printing fluid is ink, the image comprises ink particles that are aligned according to the latent image.

Figure 1:
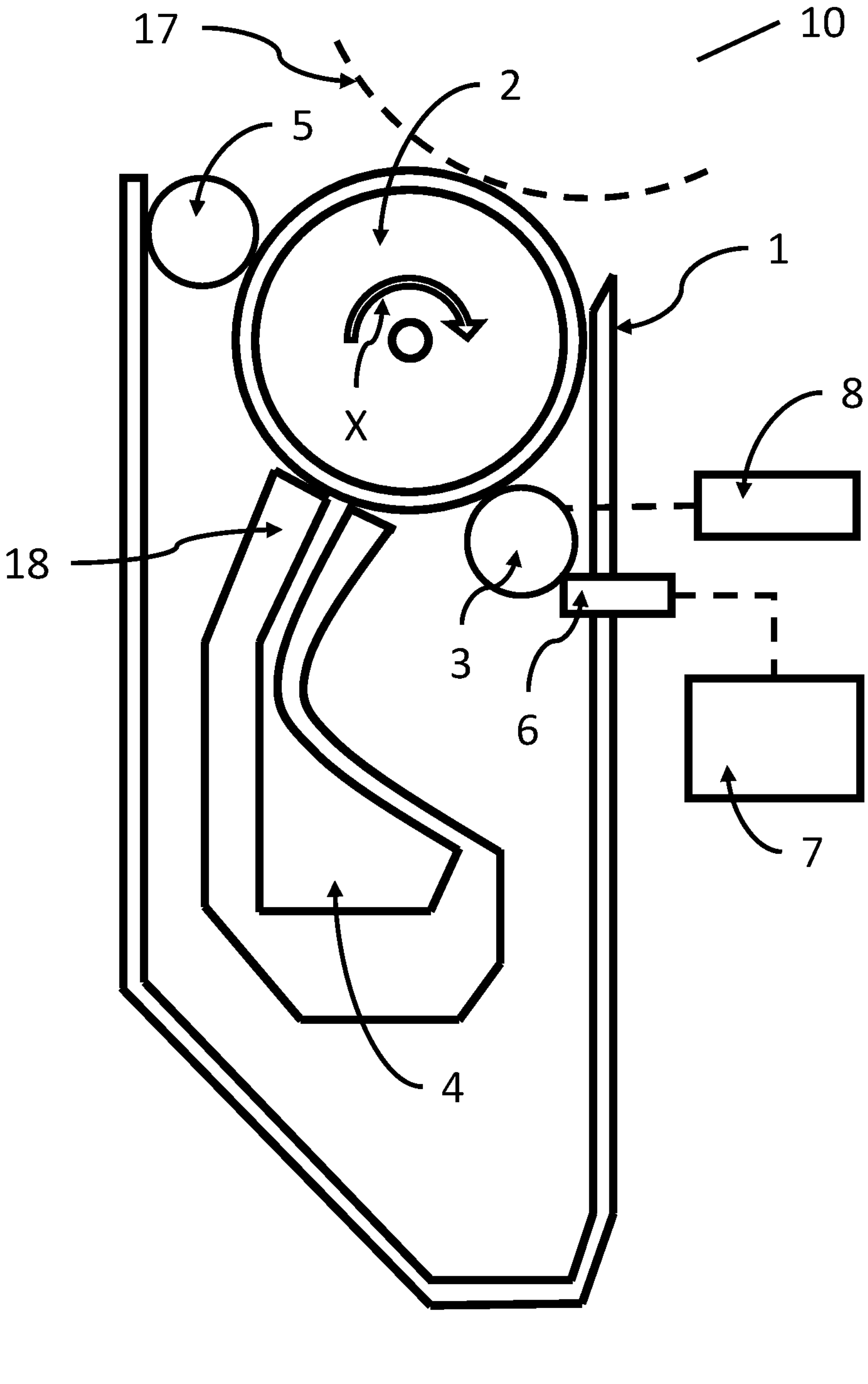
FIG. 1 shows a schematic cross-sectional view of an example printing apparatus.

As shown in FIG. 1, a BID 1 for use with in a liquid electrographic printing apparatus 10 comprises a developer roller 2 which contacts a PIP 17 to transfer printing fluid (e.g. ink) during a print. The BID 1 further comprises a cleaning member 3 to remove material, such as residual printing fluid, from the developer roller 2 to ensure efficient performance.

During electrophotographic printing, printing fluid is transferred onto the charged PIP 17 through electrostatic and mechanical forces. As such, the electrical properties of the printing fluid should remain substantially constant to ensure consistency and quality between prints. However, over time printing fluids (e.g. inks) used in electrophotographic printing suffer from electrical fatigue (ELF), meaning that their electrical properties deteriorate. Changes in electrical properties such as particle conductivity within the printing fluid and optical density upon the substrate can be indicative of ELF in a printing fluid. For example, the greater the change in optical density over time (or number of prints), the greater the ELF. When the electrical properties of a printing fluid deteriorate below a threshold, most of the printing fluid or all of the printing fluid in the system and in some cases the entire BID 1 may need to be replaced. This can be expensive, time consuming and can lead to a waste of printing fluid or other components if they cannot be reused.

It has been discovered by the inventors that there is a link between the amount of ELF a printing fluid suffers and the contact force between the cleaning member 3 and the developer roller 2 of a BID 1.

In the BID 1 shown in FIG. 1, printing fluid (e.g. ink in fluid form) is deposited on the developer roller 2 from a reservoir 4. The reservoir may be part of the BID 1 or fluidly connected to the BID 1. The developer roller 2 rotates clockwise (as denoted by arrow X) such that printing fluid on the surface of the developer roller 2 passes an electrode member 18 and a squeegee member 5 of the BID 1. By creating an electric field between the developer roller 2 and the electrode member 18, an electrostatic force is applied to the printing fluid particles which adhere to the surface of the developer roller 2. The squeegee member 5 helps to reduce the liquid content of the printing fluid and increase the solid concentration of the printing fluid such that it takes a more solid form for deposition on the PIP 17. The squeegee member 5 may also be used as a secondary developer by applying additional electrostatic forces upon the printing fluid particles. In some examples, the printing fluid is about 3% solid in the reservoir 4 and about 25% solid after passing the squeegee member 5. As the developer roller 2 continues to rotate, printing fluid is deposited onto the PIP 17. Any excess printing fluid still on the developer roller 2 downstream from the point of transfer between the developer roller 2 and the PIP 17 is diluted and removed from the developer roller 2 by the cleaning member 3, which is in contact with the developer roller 2. Removing such excess printing fluid ensures that the excess printing fluid does not contaminate the next print and allows the excess printing fluid to be reused. The surface of the developer roller 2 may conform with the cleaner member 3 at the point at which they contact. In the example shown in FIG. 1, the cleaning member 3 is in the form of a roller. In some examples, the cleaning member 3 comprises a solid roller, a sponge roller, a blade and/or printing fluid. In some examples, the cleaning member 3 may take a form other than a roller. For example, the cleaning member 3 may be in the form of a belt or a flat surface. In some examples, the cleaning member 3 is a blade or other edge.

To help ensure that the cleaning member 3 removes a sufficient amount of excess printing fluid from the developer roller 2, the cleaning member 3 contacts the developer roller 2 with a contact force. However, it has been discovered by the inventors that if the contact force varies too much from a determined range and/or if the contact force at the front of the BID 1 varies too much from the contact force at the back of the BID 1 (i.e. the contact forces are unbalanced), the printing fluid is subjected to undesirable ELF.

Figure 2A:
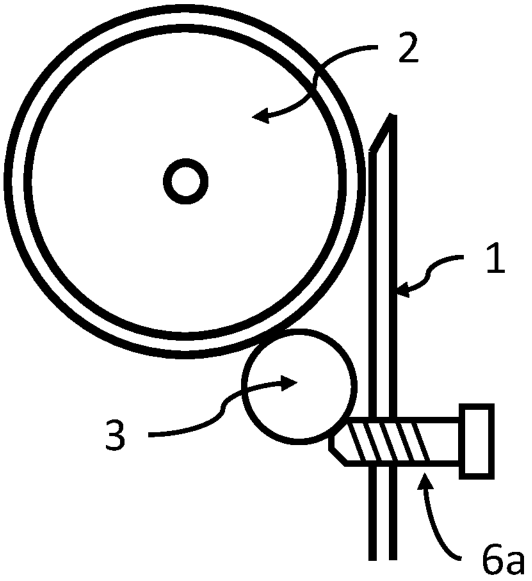
FIG. 2*a* shows a schematic view of an example force adjustment arrangement.
Figure 2B:
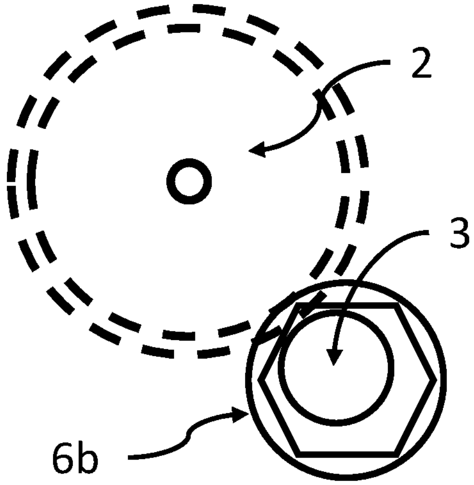
FIG. 2*b* shows a schematic view of an example force adjustment arrangement.
Figure 2C:
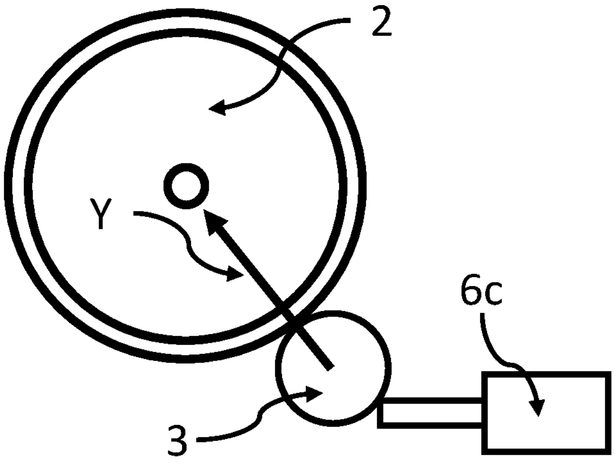
FIG. 2*c* shows a schematic view of an example force adjustment arrangement.

To ensure that a desirable force is provided between the developer roller 2 and the cleaning member 3, a force adjustment arrangement 6 is provided to adjust the contact force between the developer roller 2 and the cleaning member 3. FIGS. 2*a* to 2*c* (collectively FIG. 2) show various examples of such a force adjustment arrangement 6 that could be used in the arrangement of FIG. 1.

FIG. 2*a* shows an example force adjustment arrangement 6 comprising a set screw 6*a*. As shown in FIG. 2*a*, the set screw 6*a* is provided through a part of the BID 1. The set screw 6*a* is rotatable relative to the cleaning member 3 to apply a variable force to the cleaning member 3 to adjust the contact force. In some examples the set screw 6*a* comprises a keyed element such that a tool can be inserted into the keyed element and rotated to rotate the set screw 6*a*.

FIG. 2*b* shows an example force adjustment arrangement 6 comprising an eccentric mechanism 6*b*. An eccentric mechanism comprises an element attached to a rotating axle with a centre of the element offset from that of the axle. As shown in FIG. 2*b*, the cleaning member 3 is attached to the eccentric mechanism 6*b* such that the cleaning member 3 is provided off center on the eccentric mechanism 6*b*. That is, axes of rotation of the eccentric mechanism 6*b* and the cleaning member 3 are not co-axial. As such, when the eccentric member 6*b* is rotated, the cleaning member 3 moves relative to the developer roller 2 to adjust the contact force.

FIG. 2*c* shows an example force adjustment arrangement 6 comprising an actuator 6*c*. The actuator 6*c* is to move the cleaning member 3 relative to the developer roller 2 to adjust the contact force. In the example shown in FIG. 2*c*, the actuator 6*c* contacts a part of the cleaning member 3 to move the cleaning member 3 relative to the developer roller 2 in the direction of arrow Y. In some examples, the actuator 6*c* may be to indirectly move the cleaning member 3 by contacting a different component. For example, the actuator 6*c* may be to move the set screw 6*a* of FIG. 2*a* or the eccentric member 6*b* of FIG. 2*b* to subsequently cause movement of the cleaning member 3 relative to the developer roller 2.

In some examples, the force adjustment arrangement 6 is to adjust the contact force during manufacture of the BID and/or printing apparatus. Additionally or alternatively, the force adjustment arrangement 6 allows for the contact force to be adjusted at a time after manufacture, by a user and/or a technician. For example, over time, the contact force may decrease from that originally set, such as following wear of components. As such, the force adjustment arrangement 6 may allow the contact force to be adjusted after or during use of the printing apparatus to ensure the contact force remains at a desirable level.

Referring back to FIG. 1, in some examples, the printing apparatus 10 comprises a controller 7 that is operatively connected to the force adjustment arrangement 6. In response to an input to the controller 7, the controller 7 is to cause the force adjustment arrangement 6 to adjust the contact force. For example, the input may be an input for a user requiring a specified contact force.

In some examples, the controller 7 may be operatively connected to the actuator 6*c* such that on receiving an input, the controller 7 causes the actuator 6*c* to adjust the contact force. In some examples, the input may be a feedback from the actuator 6*c*. This can create a feedback loop such that the contact force can to adjusted to ensure that it remains substantially constant over time. This may allow the printing apparatus 10 to automatically adjust the contact force without the input of a user or technician. In some examples, the input may be from an independent external sensor.

As shown in FIG. 1, in some examples, the electrophotographic printing apparatus 10 comprises a contact force determining device 8 to determine the contact force and output information indicative of the determined contact force. For example, the contact force determining device 8 may output information indicative of the contact force to a display such that a user can monitor the contact force. In some examples, the contact force determining device 8 outputs a warning if the contact force varies from a desired value by too much. In some examples, the contact force determining device 8 outputs information indicative of the contact force to the controller 7. The controller 7 may cause the force adjustment arrangement 6 to adjust the contact force on the basis of this information.

Figure 3:
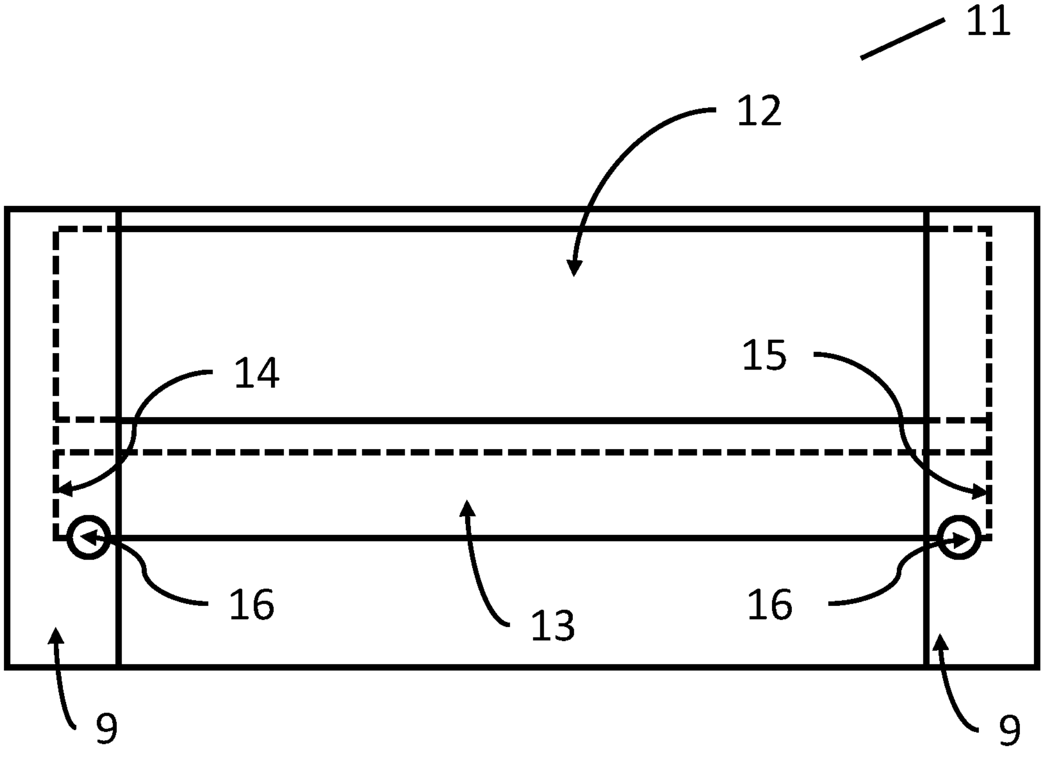
FIG. 3 shows a schematic cross-sectional view of an example binary ink developer.

FIG. 3 shows a front view of a BID 11 according to one example. The BID 11 comprises a developer roller 12 and a cleaning roller 13 and an arrangement 16 to adjustably apply a force to the cleaning roller 13 to urge the cleaning roller 13 into contact with the developer roller 12. The cleaning roller 13 contacts the developer roller 12 with a contact force. The cleaning roller 13 is to remove material form the developer roller 12 in use. In some examples, the cleaning roller 13 and developer roller 12 of FIG. 3 are equivalent to the cleaning member 3 and developer roller 2 of FIGS. 1 and 2. The BID 11 shown in FIG. 3 comprises end caps 9 on opposite ends of the BID 11. In some examples, the arrangement 16 to adjustably apply the force is enclosed within the end caps 9. This ensures that no part of the arrangement 16 extends beyond the outer bounds of the BID 11, such that the BID 11 has the same envelope as a BID without the arrangement 16 present. This allows the BID 11 to be used in existing liquid electrophotographic printer without the need for alterations to the printer. Moreover, the provision of the arrangement 16 in the end caps 9 does not interfere with the printing fluid development process within the BID 11.

In some examples, the arrangement 16 to adjustably apply the force is to apply a first force to a first end 14 of the cleaning roller 13 and to apply a second force to a second end 15 of the cleaning roller 13 opposite the first end 14. For example, a first element of the arrangement 16 may be provided at the first end 14 to apply the first force and a second element of the arrangement 16 may be provided at the second end 15 to prove the second force. In some examples, the first and second elements are any one of the force adjustment arrangements 6 discussed in relation to FIGS. 2*a* to 2*c*. Providing force adjustment arrangements 6 at the first 14 and second 15 ends of the cleaning roller 13 allows for independent control of the forces applied at the first 14 and second 15 ends of the cleaning roller 13.

In some examples, the arrangement 16 to adjustably apply the force is to apply equal first and second forces to the respective first 14 and second 15 ends of the cleaning roller 13, such that the contact force is substantially equal at the first 14 and second 15 ends. In some examples, the contact forces at the first 14 and second 15 ends are substantially equal and total under 100N. For example, the contact forces may be determined by the following equation:

$$30N \le F_{First}^{CL-DR} = F_{Second}^{CL-DR} \le 40N$$

wherein $$F_{Front}^{CL-DR}$$

is the contact force at the first end 14 and $$F_{Rear}^{CL-DR}$$

is the contact force at the second end 15.

Figure 4:
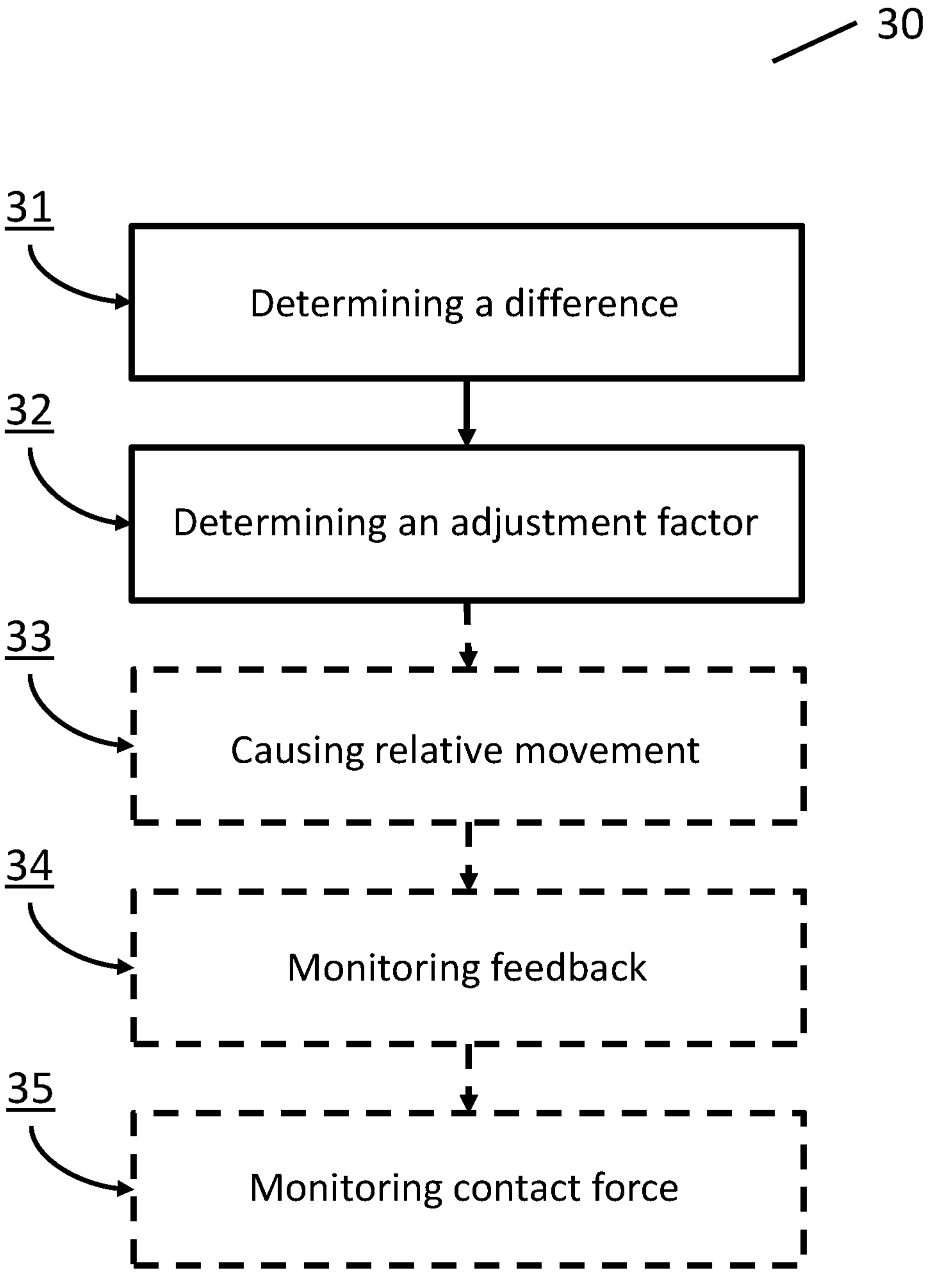
FIG. 4 shows a flow chart of an example method of reducing electrical fatigue in a printing fluid.

FIG. 4 shows a flow chart of a method 30 of reducing electrical fatigue in a printing fluid (e.g. ink). The method 30 may be performed using the apparatus discussed above, such as by the controller 7. The method 30 comprises determining a difference 31 between a predetermined force and a contact force with which a cleaning member 3 contacts a developer roller 2; and determining an adjustment factor 32 to be applied to reduce the difference. The predetermined force may be the desired force to reduce ELF while ensuring that the cleaning member 3 has sufficient contact with the developer roller 2. In some examples, the predetermined force is the force determined from the above equation.

In some examples, the method 30 comprises causing relative movement 33 between the cleaning member 3 and the developer roller 2 on the basis of the adjustment factor to reduce the difference between the predetermined force and the contact force. The method 30 may cause relative movement 33 between the cleaning member 3 and the developer roller 2 such that the contact force is substantially equal to the predetermined force.

In some examples, the method 30 comprises causing the relative movement 33 by operating an actuator that is in contact with the cleaning member 3 and monitoring feedback 34 from the actuator to determine the contact force. The actuator may be the actuator 6*c* as discussed in relation to FIG. 2*c*. The monitored feedback of the actuator 6*c* may be indicative of the contact force. As such, the feedback of the actuator 6*c* can be used to determine the adjustment factor 32.

In some examples, the method 30 comprises monitoring 35 the contact force during operation of the cleaning member 3. This allows the method 30 to determine how the contact force varies over time and during operation of the cleaning member 3. Consequently, the method 30 may output to a user an indication that the contact force has fallen to an undesirable level such that adjustment should occur.

In some examples, the monitoring 35 the contact force is performed at predetermined time intervals during the operation of the cleaning member 3. Alternatively, the monitoring 35 the contact force is performed substantially continually during operation of the cleaning member 3.

In some examples, the method 30 is automated such that the method 30 automatically causes the relative movement 33 between the cleaning member 3 and the developer roller 2 on the basis of the adjustment factor to ensure that the contact force is kept at a desired level without the input of a user or technician. When the contact force is continually monitored, the method 30 may substantially continually cause the relative movement 33 to ensure the contact force is kept at the desired level during a print. Alternatively, in order to not interfere with a print, the method 30 may cause the relative movement 33 between prints.

By adjusting the relative force between the developer roller 2, 12 and cleaning member/roller 3, 13 as discussed above in relation to the printing apparatus 10, the BID 1 and method 30, the lifetime of printing fluids used in liquid electrophotographic printing can be prolonged, costs can be reduced by avoiding the need for replacement parts and there can be an increase in the amount of printing fluid reused. Moreover, print quality can be increased.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A liquid electrophotographic printing apparatus comprising:
- a developer roller;
- a cleaning member to contact the developer roller with a contact force, the cleaning member to remove excess printing fluid from the developer roller after the developer roller has applied printing fluid to a photo imaging plate;
- a force adjustment arrangement to, when the contact force varies from a predetermined force, apply a variable force to the cleaning member to adjust the contact force between the cleaning member and the developer roller such that the contact force is substantially equal to the predetermined force; and
- a contact force determining device to determine the contact force and output information indicative of the determined contact force.

2. The liquid electrophotographic printing apparatus according to claim 1, wherein the force adjustment arrangement comprises a set screw, wherein the set screw is rotatable relative to the cleaning member to apply the variable force to the cleaning member to adjust the contact force.

3. The liquid electrophotographic printing apparatus according to claim 1, wherein the force adjustment arrangement further comprises an eccentric mechanism attached to the cleaning member, and wherein the eccentric mechanism is to move the cleaning member relative to the developer roller to adjust the contact force.

4. The liquid electrophotographic printing apparatus according to claim 1, comprising a controller, wherein, in response to an input to the controller, the controller is operatively connected to the force adjustment arrangement to cause the force adjustment arrangement to apply the variable force to the cleaning member to adjust the contact force.

5. The liquid electrophotographic printing apparatus according to claim 1, wherein the force adjustment arrangement comprises an actuator that is in contact with the cleaning member, and wherein the actuator is to move the cleaning member relative to the developer roller to adjust the contact force and feedback from the actuator is monitored to determine the contact force.

6. The liquid electrophotographic printing apparatus according to claim 1, wherein the force adjustment arrangement is to adjust the contact force to be substantially constant to offset changes in the contact force caused by electrical fatigue.

7. A binary ink developer for use in a liquid electrophotographic printing apparatus, the binary ink developer comprising:

a developer roller and a cleaning roller, wherein the cleaning roller is to remove excess printing fluid from the developer roller in use; and an arrangement to adjustably apply a force to the cleaning roller to adjust a contact force between the cleaning roller and the developer roller, wherein the cleaning roller is located downstream of the developer roller, the downstream location arranged after a point of transfer where the developer roller applies printing fluid to a photo imaging plate, and wherein, when the contact force between the cleaning roller and the developer roller varies from a predetermined force, the arrangement is to apply the force to the cleaning roller to adjust the contact force such that the contact force is substantially equal to the predetermined force, wherein the arrangement to adjustably apply the force is to apply a first force to a first end of the cleaning roller and to apply a second force to a second end of the cleaning roller opposite the first end.

8. The binary ink developer according to claim 7, wherein the arrangement to adjustably apply the force is to apply equal first and second forces to respective first and second ends of the cleaning roller.

9. The binary ink developer according to claim 7, wherein the arrangement comprises an actuator that is in contact with the cleaning roller, and wherein the actuator is to move the cleaning roller relative to the developer roller to adjust the contact force and feedback from the actuator is monitored to determine the contact force.

10. A method of reducing electrical fatigue in a printing fluid, the method comprising:

determining a difference between a predetermined force and a contact force with which a cleaning member contacts a developer roller, the cleaning member to remove excess printing fluid from the developer roller after the developer roller has applied printing fluid to a photo imaging plate; and determining an adjustment factor to be applied to reduce the difference.

11. The method according to claim 10, comprising causing the relative movement between the cleaning member and the developer roller on the basis of the adjustment factor to reduce the difference between the predetermined force and the contact force.

12. The method according to claim 10, comprising monitoring the contact force during operation of the cleaning member.

13. The method according to claim 12, wherein the monitoring is performed at predetermined time intervals during the operation of the cleaning member.

14. The method according to claim 12, wherein the monitoring is performed substantially continually during the operation of the cleaning member.

15. The method according to claim 10, further comprising:

causing relative movement by operating an actuator that is in contact with the cleaning member; and monitoring feedback from the actuator to determine the contact force.

* * * * *